June 22, 1926.
E. HENDERSON
TIRE CHAIN FASTENER
Filed Feb. 26, 1926
1,589,852
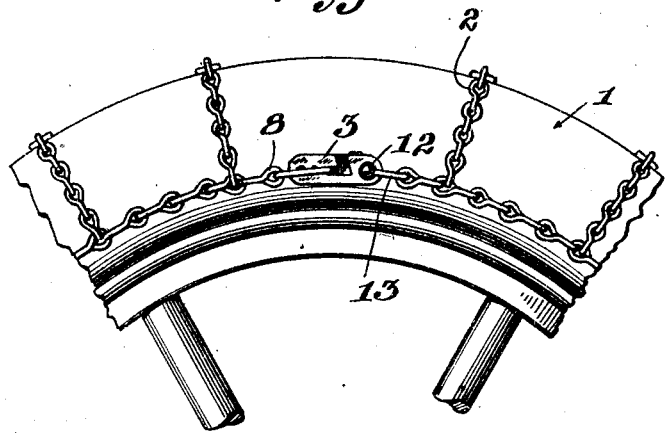
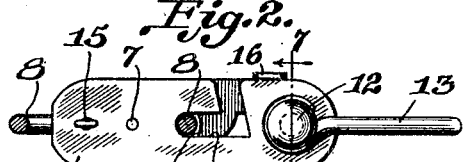
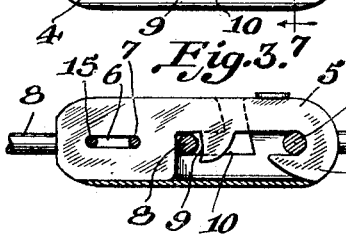
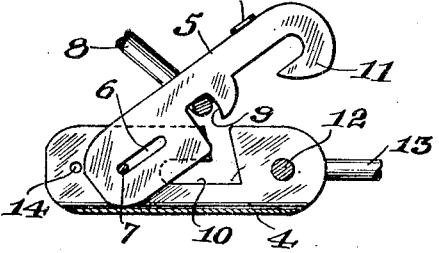
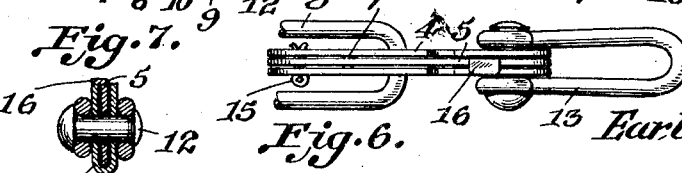
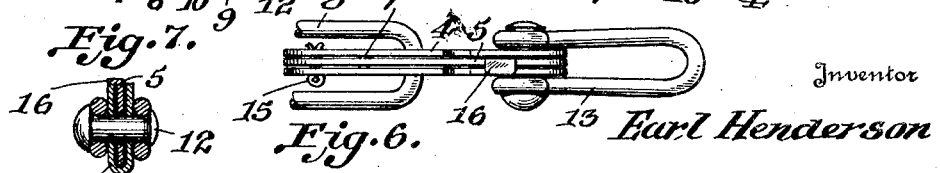
Inventor
Earl Henderson
By Eccleston & Eccleston,
Attorneys Patented June 22, 1926.

1,589,852

UNITED STATES PATENT OFFICE.

EARL HENDERSON, OF GRAFTON, WEST VIRGINIA.

TIRE-CHAIN FASTENER.

Application filed February 26, 1926. Serial No. 90,971.

This invention while of general application relates more particularly to tire chain fasteners and has for its object to generally improve such constructions.

A further object of the invention resides in the provision of a chain hook which when moved to closed position will draw the chain to the tire, and in which the pull or strain will be longitudinally of the hook.

Another object of the invention consists in the construction of such a hook which will not accidentally open after being closed.

Other objects and advantages of the invention will be apparent from the following description when taken in connection with the accompanying drawing; in which—

Figure 1 is a fragmentary view of a tire and chain with the improved fastener in place.

Figure 2 is a side elevation of the fastener per se.

Figure 3 is a longitudinal section through the fastener in locked position.

Figure 4 is a view similar to Figure 3 showing the latch partly opened.

Figure 5 is a view also similar to Figure 3 showing the latch swung to open position.

Figure 6 is a plan view of the fastener; and

Figure 7 is a section taken on line 7—7 of Figure 2.

Referring to the drawings in greater detail, the numeral 1 refers to a tire and wheel of ordinary construction and to which is applied a chain 2 also of conventional form except for the means of attaching the free ends thereof; such means, which constitutes the present invention, is indicated generally by the numeral 3.

The fastener 3 comprises two elements, namely, a casing 4 which is U-shaped in cross-section and a latch element 5 which is pivotally and slidably connected to the casing 4. This connection is provided by means of a longitudinally extending slot 6 formed in the latch 5 which cooperates with a pin 7 transversely mounted in the casing 4.

In order to secure the free end 8 of the chain the latch 5 is provided with a transverse slot 9 adapted for cooperation with the L-shaped slot 10 formed in the casing 4. In securing the chain to the tire one end of the link 8 will be placed in slot 9 as indicated in Figure 5 and as the latch is swung to closed position it is obvious that the chain will be drawn taut.

For the purpose of holding the latch 5 in closed position the same is formed with an overhanging hook 11 which is adapted to engage over bolt 12 which is employed for anchoring the opposed end 13 of the chain to the casing 4. As soon as the latch 5 is swung about its pivot to closed position therefore, it will be slid to latching position by the pull of the chain due to the engagement of the link 8 with a wall of the slot 9 formed in the latch. This sliding movement will, of course, cause the hook element 11 to engage bolt 12 and continue to hold it against accidental displacement therefrom. The bolt 12 as well as the coaction of the rear end of the latch with the bottom of the U-shaped casing 4 will afford means for preventing movement of the latch about its pivot.

As an additional means to prevent accidental opening of the latch and loss of the chain, especially when the chain is to remain in use for a long period, the casing 4 is provided with an aperture 14 through which a cotter pin 15 may be passed. This aperture 14 is in alignment with the rear end of slot 6 when the latch is in latched position and the introduction of the pin 15 through the slot 6 and aperture 14 will, of course, positively lock the latch 5 against relative sliding movement with respect to the casing 4.

The latch 5 is preferably formed with a finger engaging portion 16 for moving the latch about its pivot to closed position, but a manipulation of the link 8 will serve to slide the latch 5 to its released position and to swing it open as shown in Figures 4 and 5 respectively; i. e., after the cotter pin 15 is removed.

From the foregoing description considered in connection with the accompanying drawings it will be apparent that I have devised an exceedingly inexpensive chain fastener and yet one which is durable and reliable in operation; that the closing of the fastener tends to tighten the chain on the tire; and that the chain itself not only acts to slide the latch to latching position but also to hold it in this position while the chain is in use. Furthermore, it will be apparent that the action of the L-shaped slot is such as to prevent the link 8 from accidentally forcing the latch 5 to open position.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. A chain fastener including a casing, means for anchoring a chain to one end thereof, a latch pivotally and slidably connected to said casing, and means on said latch for engaging over a portion of said chain anchoring means.

2. A chain fastener including a casing slotted to receive the free end of a chain, the opposite end of which is anchored to said casing, a latch pivotally and slidably connected to said casing, and means on said latch for engaging over a portion of the anchored end of said chain.

3. A chain fastener including a casing U-shaped in cross-section, said casing provided with a slot adapted to receive the free end of a chain, means for anchoring the opposite end of said chain to said casing, a latch pivotally and slidably connected to said casing, said latch provided with a slot for cooperation with said first-mentioned slot, and means on said latch for engaging said anchoring means.

4. A chain fastener including a casing U-shaped in cross-section, said casing provided with an L-shaped slot adapted to receive the free end of a chain, means for anchoring the opposite end of said chain to said casing, a latch pivotally and slidably connected to said casing, said latch provided with a slot for cooperation with said first-mentioned slot, and a hook on said latch for engaging said anchoring means.

5. A chain fastener including a casing U-shaped in cross-section, said casing provided with a slot adapted to receive the free end of a chain, means for anchoring the opposite end of said chain to said casing, a latch, a pin and slot connection between said latch and casing, said latch provided with a slot for cooperation with said first-mentioned slot, said casing provided with a perforation for the reception of a cotter pin, and a hook on said latch for engaging said anchoring means.

6. A chain fastener including a casing provided with an L-shaped slot, means for anchoring a chain to one end thereof, a latch pivotally and slidably associated with said casing and adapted to receive the free end of said chain, and an overhanging hook on said latch, the construction of the casing and latch being such as to cause the latch to move to locked position when the chain is drawn taut with the hook in engagement with the anchoring means.

EARL HENDERSON.